Figure 1:
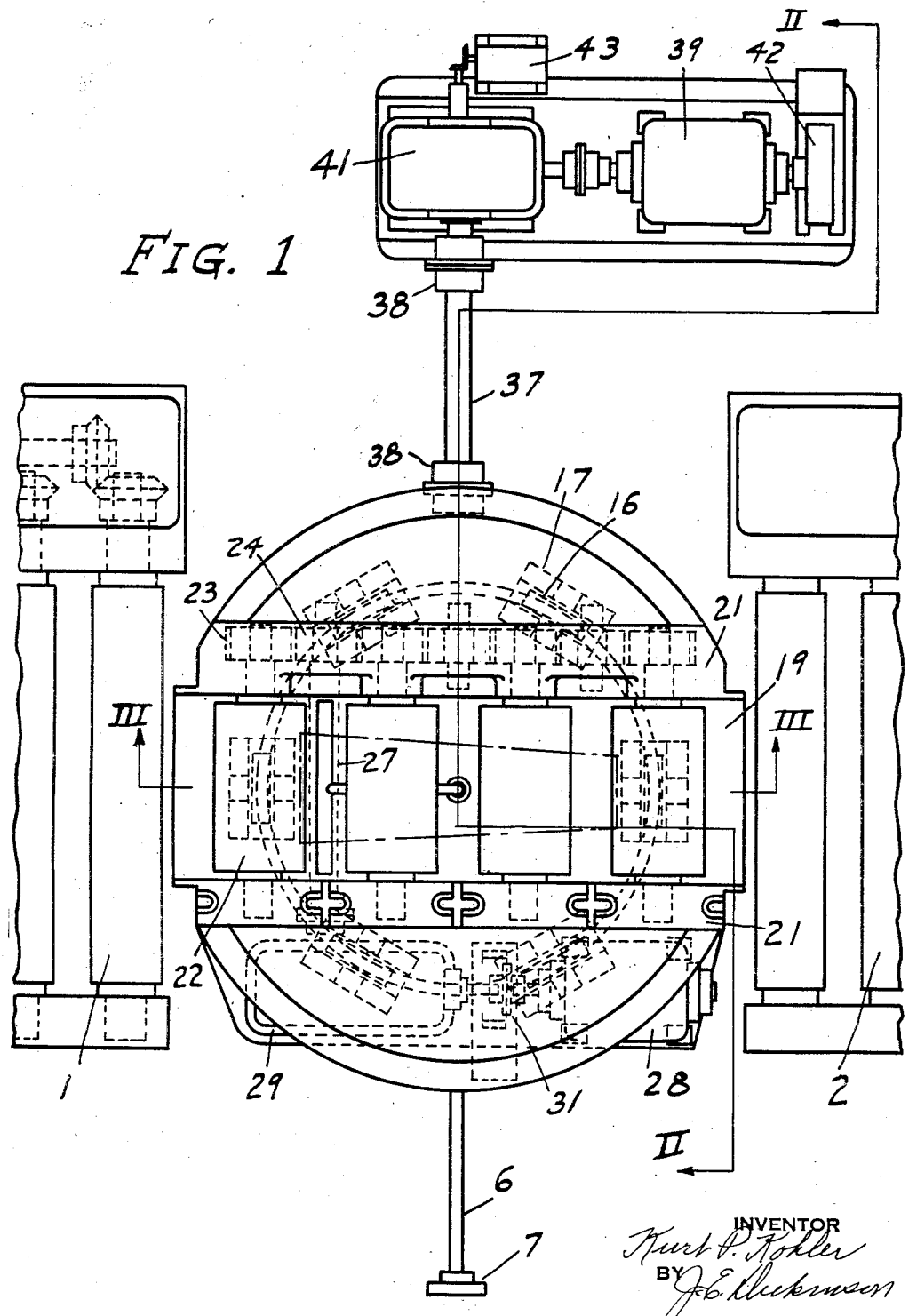

Oct. 6, 1942.    K. P. KOHLER    2,297,898
WORK MANIPULATING AND WEIGHING DEVICE
Filed May 19, 1939    4 Sheets-Sheet 1

INVENTOR
Kurt P. Kohler
BY
ATTORNEY

Oct. 6, 1942.                K. P. KOHLER                2,297,898
                WORK MANIPULATING AND WEIGHING DEVICE
                    Filed May 19, 1939        4 Sheets-Sheet 2

INVENTOR
Kurt P. Kohler
BY
J. E. Dickman
ATTORNEY

Oct. 6, 1942.  K. P. KOHLER  2,297,898
WORK MANIPULATING AND WEIGHING DEVICE
Filed May 19, 1939  4 Sheets-Sheet 3

INVENTOR
Kurt P. Kohler
BY
J. E. Dickman
ATTORNEY

Patented Oct. 6, 1942

2,297,898

UNITED STATES PATENT OFFICE 2,297,898

WORK MANIPULATING AND WEIGHING DEVICE

Kurt P. Kohler, Pittsburgh, Pa., assignor to United Engineering and Foundry Company, Pittsburgh, Pa., a corporation of Pennsylvania Application May 19, 1939, Serial No. 274,538

3 Claims. (Cl. 80—44)

This invention relates to apparatus for manipulating and weighing workpieces, and more particularly to a combined turntable and scale for turning and weighing ingots, slabs, and the like in the course of their being acted upon by metal-working apparatus.

It is often necessary to turn a workpiece end for end and also to weigh it while it is being operated upon or processed; for example, while passing from one rolling mill to another. Heretofore, it has been the practice to use for this purpose a turntable and a separate and independent scale with the necessary conveyors and handling apparatus for transporting workpieces to and from these devices. This procedure not only requires considerable extra apparatus, but also necessarily involves loss of time and, in case the workpiece was heated for rolling, loss of temperature which adversely influences the subsequent rolling operation, the quality of the rolled product, and the life and efficiency of the rolling equipment. The cost of production is therefore increased, as is the danger to the workmen due to more and longer handling of a workpiece necessitated by separate turning and weighing apparatus.

It is among the objects of this invention to materially reduce these disadvantages by providing weighing and turning apparatus which is combined in one unit, which is relatively compact, which can be located in the normal path of travel of a workpiece being processed, which is simple in construction and operation, and which materially decreases the time required for turning and weighing workpieces.

In accordance with this invention a weighing scale is mounted in the path of travel of a workpiece being operated upon, such as between two rolling mills. A turntable is supported by the scale so that a workpiece can be weighed while resting on the table. The table carries a plurality of laterally spaced driven rollers which form a short conveyor for receiving a workpiece from a runout conveyor or the like terminating adjacent the turntable. Extending away from the table at another point is another conveyor by which the workpiece is carried on its way. Driving means, located either at one side of or in the table itself, is provided for turning the table so that the entry end of its own conveyor can be swung around to the second conveyor for discharging the workpiece tail foremost onto the latter. For this purpose the driving means for the table conveyor rollers is reversible. While the workpiece is on the turntable its weight is noted from the weighing scale that supports the table. Therefore, the weighing and turning of the workpiece can be accomplished at substantially the same time without transfer from one apparatus to another.

Figure 2:
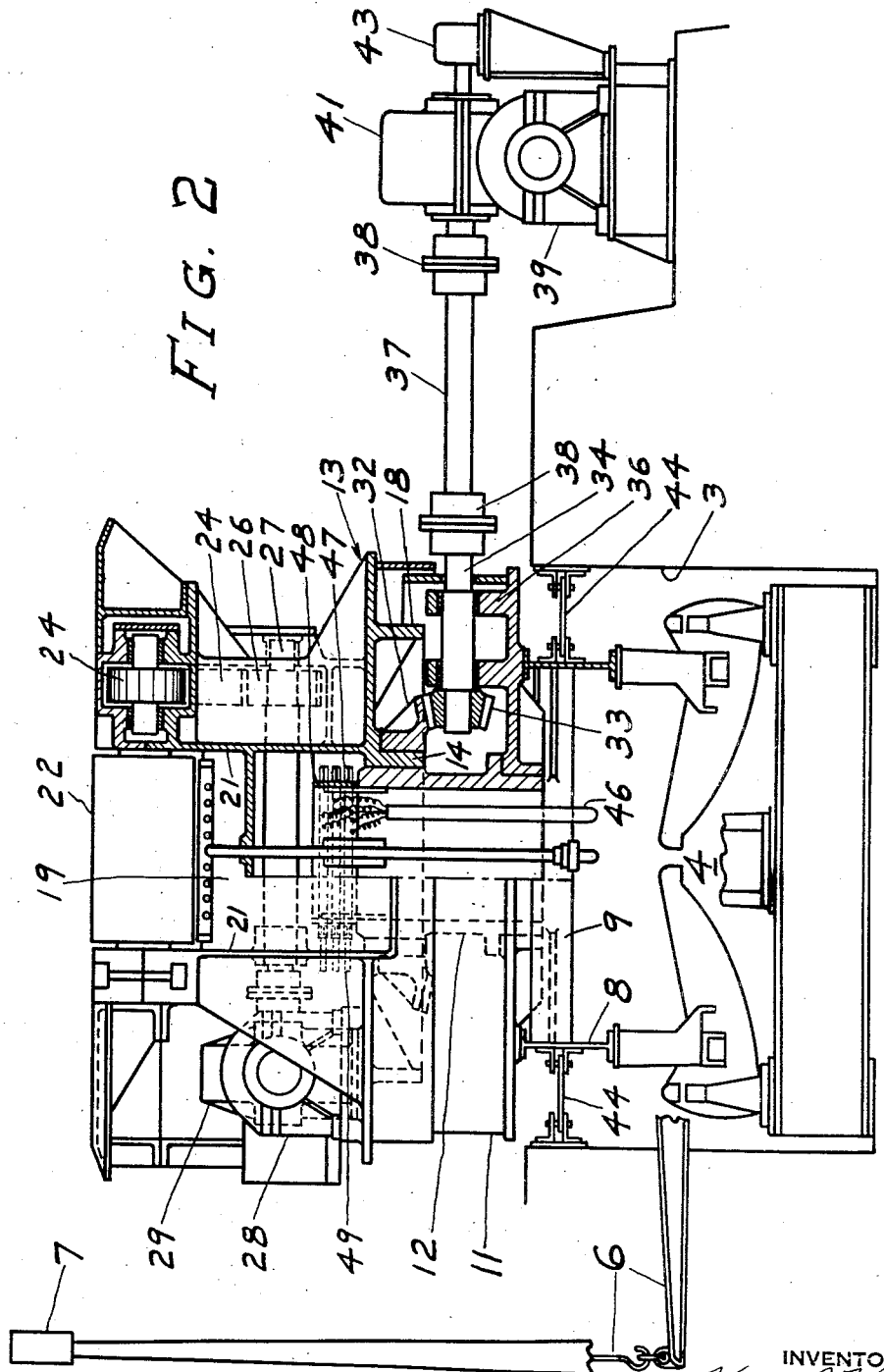
Figure 3:
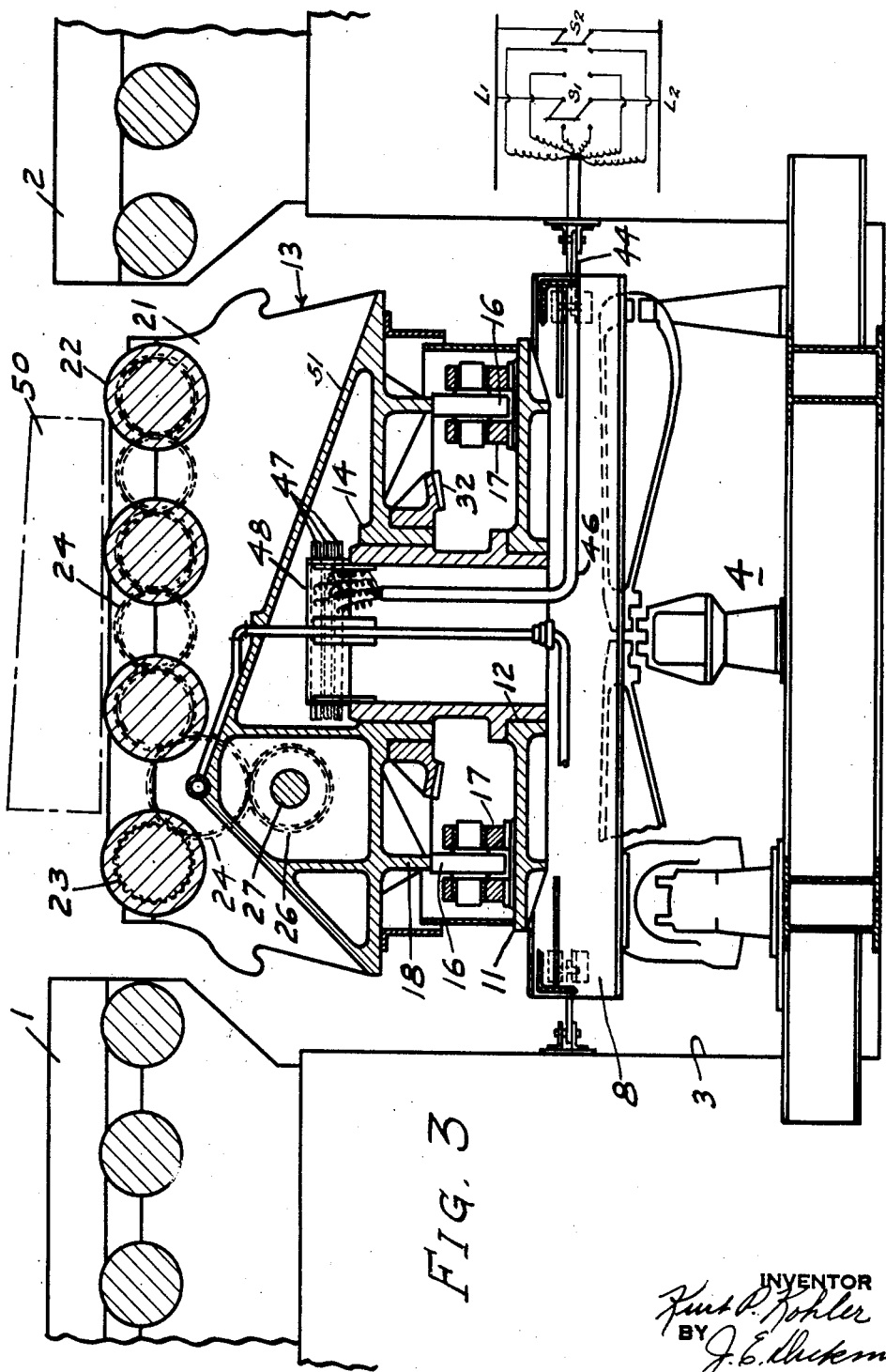
Figure 4:
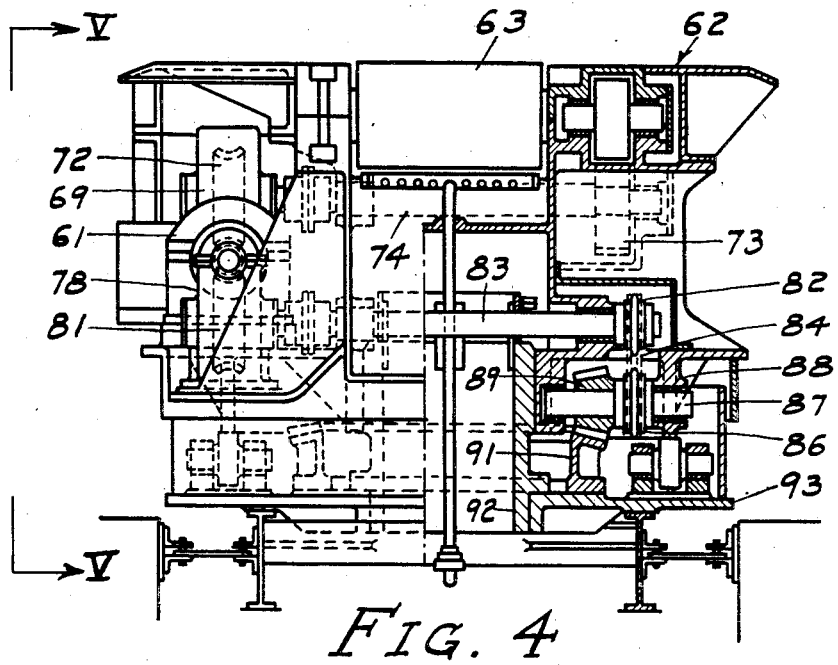
Figure 5:
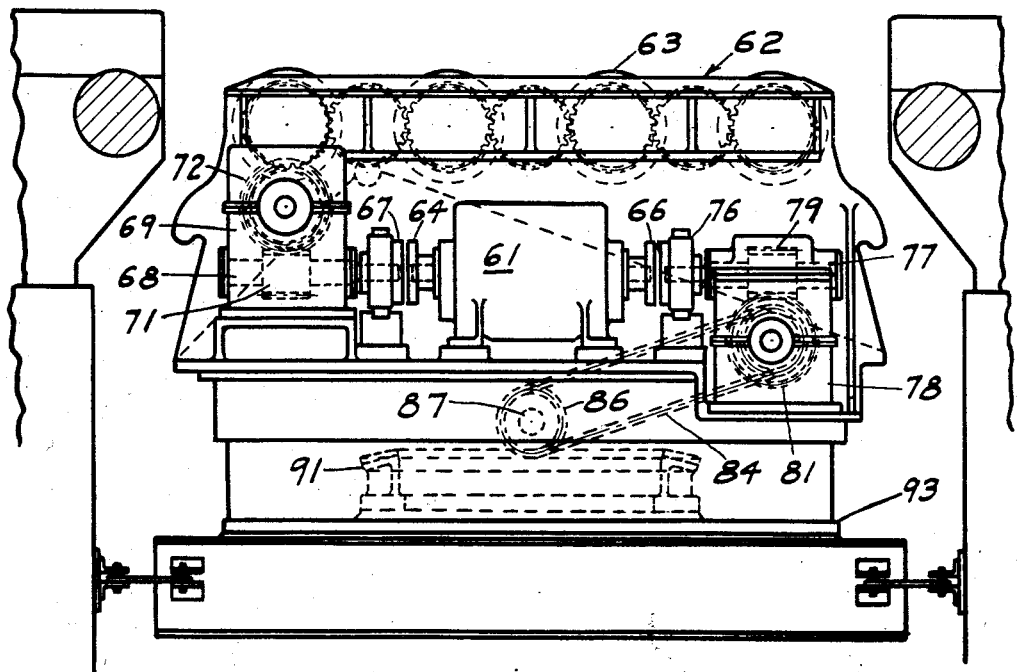

The invention is illustrated in the accompanying drawings in which Fig. 1 is a plan view of my combined turntable and scale; Fig. 2 is a side view partly in section taken on the line II—II of Fig. 1; Fig. 3 is a vertical section taken on the line III—III of Fig. 1; Fig. 4 is a view similar to Fig. 2 of a modified embodiment of this invention; and Fig. 5 is a side view thereof taken on the line V—V of Fig. 4.

Referring to Fig. 3 of the drawings, the adjacent ends of a pair of conveyors 1 and 2 are spaced apart to provide a gap between them below which a pit 3 is formed in the supporting floor or other substructure. These conveyors transport workpieces from one point to another while they are being processed, and therefore conveyor 1 may be the runout table of a rolling mill stand and conveyor 2 may deliver workpieces to a following mill stand. Disposed in the pit 3 is a weighing scale 4 the substructure and mechanism of which is of more or less conventional form and is connected by the usual links and levers 6 (Fig. 2) to an indicator 7 by which a weight reading may be taken. The upper part of the scale includes a pair of parallel I-beams 8 rigidly connected by transverse bracing members 9.

It is a feature of this invention that means for turning a workpiece end for end is mounted on the scale, whereby a double purpose unit is formed. Accordingly, rigidly mounted on the I-beams 8 is a circular platform 11 having a central opening in which the lower end of a hollow cylindrical post 12 is secured. A turntable 13 is disposed above the platform and is provided at its bottom with a central hub 14 that snugly receives the upper end of the post 12 on which it is journaled. The weight of this table is carried by a plurality of supporting rollers 16 journaled in bearing brackets 17 mounted in pairs on the scale platform at circumferentially spaced intervals near its periphery. The axes of these rollers extend radially of the platform (Fig. 1), and the portion of the table engaging the rollers is preferably in the form of a depending ring 18 forming an annular track.

The upper portion of the table is divided by an opening 19, extending transversely through it, into two spaced parallel side frames 21 in which the shafts of a plurality of laterally spaced conveyor rollers 22 are journaled. These rollers are rotated by gears 23 keyed on their shafts and connected by intermediate idler gears 24, all of these gears being driven by a pinion 26 mounted on a shaft 27 turned by a reversible motor 28 through a speed reducing unit 29. The motor is provided with a magnetic brake 31, and all of these driving elements are mounted on the turntable so as to turn with it.

For rotating the turntable, the lower end of its hub 14 is encircled by a downwardly facing bevel gear 32 secured thereon and meshing with a bevel pinion 33 (Fig. 2) mounted on the inner end of a shaft 34 journaled in pedestal bearings 36 projecting upwardly from the scale platform. This shaft is connected by a telescoping drive shaft 37 and universal joints 38 to an electric motor 39 mounted at one side of the apparatus on a suitable support with a speed reducing unit 41, magnetic brake 42, and limit switch 43, as shown in Fig. 1. The scale is prevented from being turned by the rotation of the table, by means of links 44 connected to its I-beams 8 and the sides of pit 3 in such a manner as not to interfere with the normal vertical movements of the scale.

The electrical conductors 46 that serve the motor 28 and brake 31 mounted on the turntable are led in through the hollow post 12 and are connected to a group of collector rings 47 encircling an insulating ring 48 secured to the top of the post. The terminals of this motor and brake are connected by suitable conductors to brushes 49 that engage the collector rings in the usual way, as shown in Fig. 2. The opposite ends of the conductor connected to the collector rings which serve the motor are connected to a suitable reversing switch S1, which, in turn, is connected between the two power lines indicated generally as L1 and L2, respectively. The terminals of the conductors which serve the brake through one of the collector rings are also connected to the lines L1 and L2 through a suitable switch S2. Positioned between the conveyor rolls 22 and the post 12 is a roof-like structure 51, the purpose of which is to deflect the loose scale which may fall from the conveyor and workpiece and prevent its entering and fouling the turntable mechanism.

In operation, the turntable 13 is positioned with its roller conveyor in line with conveyor 1, as shown in Fig. 1. A workpiece is discharged from conveyor 1 onto the driven table rollers 22 by which it is carried to the center of the table, as shown in broken lines at 50 in Fig. 3, whereupon the current to the motor 28 is shut off and the magnetic brake 31 is energized to stop the rollers. The weight of the workpiece is transmitted through the table to the supporting scale 4 and can be read on indicator 7 at the side of the apparatus. The motor 28 may then again be energized for driving the table rollers so as to discharge the workpiece onto conveyor 2. To decrease the impact of the workpiece as it moves onto or off from the vertically movable turntable, the tops of the table conveyor rollers preferably lie in the plane of the top of conveyor 1 when no workpiece is on the table, and the top of conveyor 2 preferably lies substantially in the common plane of the tops of the table rollers when they support a workpiece.

In case conveyor 2 is not in line with conveyor 1, or if it is desired to turn the workpiece end for end as it passes from one main conveyor to the other, the table-rotating motor 39 is energized so that the pinion 33 (Fig. 2) will rotate the gear 32 and thereby turn the table around the pivot post 12. The limit switch 43 is set to shut off the motor and apply the magnetic brake 42 when the desired end of the table conveyor is in line with conveyor 2. If the workpiece has thus been turned end for end, the roller driving motor 28 is reversed so as to cause the table rollers 22 to discharge the workpiece from the same end of the table conveyor that originally received it.

In the modified embodiment of my invention shown in Figs. 4 and 5, the apparatus is entirely self-contained; that is, the table-rotating motor is carried by the turntable itself instead of being mounted at one side of it on a fixed support. In this embodiment a single reversible motor 61, mounted in the side of the turntable 62, alternately serves to drive the table conveyor rollers 63 and to rotate the turntable. For this purpose the drive shaft of the motor projects from both of its ends, clutch members 64 and 66 being mounted on the ends of the shaft. Clutch member 64 is adapted to be connected to a clutch member 67 mounted on the projecting end of a shaft 68 journaled in a housing 69 where it carries a worm 71 that meshes with a worm gear 72. As shown in Fig. 4, the latter drives a pinion 73 through a shaft 74 extending across the table beneath one of the conveyor rollers. This pinion drives the rollers in the same general manner as previously pointed out herein.

The clutch member 66 at the opposite end of the motor is adapted to be connected to a clutch member 76 mounted on the projecting end of a shaft 77 journaled in a housing 78 also carried by the turntable. This shaft carries a worm 79 that meshes with a worm gear 81 which drives a sprocket 82 on the opposite end of a shaft 83. This sprocket is connected by a chain 84 to another sprocket 86 keyed on a short shaft 87 journaled in bearings 88 projecting downwardly from the bottom of the turntable, as shown in Fig. 4. A bevel pinion 89 is also rigidly mounted on this shaft and meshes with a bevel gear 91 encircling hollow pivot post 92 and secured to a stationary scale platform 93. Rotation of the bevel pinion will therefore cause it to travel around the bevel gear and thereby rotate the table around the vertical pivot post.

It will thus be seen that to drive the table conveyor rollers 63, the motor 61 is connected to shaft 68 through clutch members 64 and 67. When it is desired to rotate the turntable, these clutch members are disengaged and clutch members 66 and 76 are engaged. The motor is thereby operatively connected to shaft 77 which indirectly drives the bevel pinion 89. Suitable limit switches and magnetic brakes may be provided in connection with the motor for the usual purposes.

Combined weighing and turning apparatus constructed in accordance with this invention is relatively simple and easy to operate. It is so compact that it requires but little space, and can therefore be located in the normal path of workpieces being processed. The weighing and turning of a workpiece can be accomplished at substantially the same time, at least without intervening operations. Another important advantage is that this apparatus eliminates the former necessity for additional apparatus to transfer workpieces from the scale to the turntable, or vice versa, and the attendant increased expense and dangers.

According to the provisions of the patent statutes, I have explained the principle and construction of my invention and have illustrated and described what I now consider to represent its best embodiments. However, I desire to have it understood that, within the scope of the appended claims, the invention may be practiced otherwise than as specifically illustrated and described.

I claim:

1. A table section of a mill table comprising a weighing scale equipped with a circular-shaped weight supporting platform, a vertically arranged cylindrical post mounted in a centrally disposed opening in said platform, a turntable located above said platform, a centrally disposed hub on the lower side of said turntable arranged to fit over the upper end of said vertically arranged post, a series of annularly spaced vertically disposed rollers mounted on the top of said weight-supporting platform, an annular downwardly projecting rail on the bottom of said turntable positioned to engage said rollers, a series of horizontally spaced article supporting rollers mounted in the top of said turntable, means mounted in said table for rotating said article-supporting rollers, and power means for rotating said table.

2. A table section of a mill table according to claim 1 in which a roof-shaped partition is provided in the turntable directly beneath the article-supporting rollers to protect the equipment therebeneath from scale and dirt falling from the articles passed over the article-supporting rollers.

3. A table section for a mill table according to claim 1 in which an electric motor is mounted on said turntable for rotating said article rollers and the current supply therefor is delivered to said motor through slip rings secured to said vertically disposed post mounted on said scale platform.

KURT P. KOHLER.